United States Patent [19]

Kreuzer

[11] Patent Number: 5,013,065

[45] Date of Patent: May 7, 1991

[54] GAS BAG APPARATUS FOR PROTECTION AGAINST AN IMPACT

[75] Inventor: Martin Kreuzer, Kleinwallstadt, Fed. Rep. of Germany

[73] Assignee: Kolbenschmidt Aktiengesellschaft, Neckarsulm, Fed. Rep. of Germany

[21] Appl. No.: 430,703

[22] Filed: Nov. 1, 1989

[30] Foreign Application Priority Data

Nov. 1, 1988 [DE] Fed. Rep. of Germany ....... 3837085

[51] Int. Cl.$^5$ .............................................. B60R 21/20
[52] U.S. Cl. ................................... 280/743; 280/731; 280/732
[58] Field of Search ................ 280/731, 732, 743, 730

[56] References Cited

U.S. PATENT DOCUMENTS 4,842,300 6/1989 Ziomek et al. ...................... 280/732

Primary Examiner—Kenneth R. Rice
Attorney, Agent, or Firm—Sprung Horn Kramer & Woods

[57] ABSTRACT

The gas bag apparatus for protection against an impact is adapted to be integrated into the steering wheel or instrument board of motor vehicles and comprises a covering, which is made of elastic plastic and connected to the carrier for a gas generator. The cover of the covering has exactly defined rated break lines and the covering comprises a peripheral annular frame, which is secured to the carrier and is connected by hingelike joints to the cover sections which are defined by the rated break lines. In order to eliminate the need for a reinforcement, the covering consists of a one-piece injection molding which is made of a thermoplastic elastomer.

7 Claims, 1 Drawing Sheet

GAS BAG APPARATUS FOR PROTECTION AGAINST AN IMPACT

BACKGROUND OF THE INVENTION

This invention relates to a gas bag apparatus for protection against an impact, which apparatus is adapted to be integrated into the steering wheel or instrument board of motor vehicles and consists of a carrier, which accommodates the collapsed, inflatable gas bag and the solid-fuel-operated gas generator, which is connected to the gas bag, and of a covering, which consists of elastic plastic and extends over the rim of the gas bag and is joined to the carrier and has a cover having exactly defined rated break lines, wherein the covering comprises a peripheral annular frame, which is secured to the carrier and is joined by hingelike joints to the cover sections, which are defined by the rated break lines.

A gas bag apparatus for protection against an impact comprises as a carrying element a generator carrier, which in addition to the solid-fuel-operated gas generator must accommodate the collapsed, inflatable gas bag and its locking plate (flange plate). The carrier is surrounded by a clip bar, which holds the covering of the gas bag; that covering consists of integral polyurethane foam. On the side facing the steering shaft the gas generator and its locking plate are screw-connected to the carrier and non-detachably riveted. In response to an impact, the covering consisting, as a rule, of polyurethane, tears under the pressure of the inflating gas bag exactly along defined rated break lines. The wall thickness of the covering generally amounts to 3.0 to 6.0 mm and is reduced along said rated break lines to 0.25 to 0.75 mm.

In order to ensure that a separation or tearing of the cover section or a detaching of minute particles as the gas bag is inflated will be prevented at all temperatures, the covering is reinforced by special inserts. The reinforcement may consist, e.g., of a high-strength strap, which is closed in itself and is made, e.g., of a woven fabric of aramid or polyamide and is embedded in the elastic plastic in the transitional portion between the cover and the frame of the covering (Published German Application No. 29 05 618).

In accordance with Published German Application No. 31 16 538 the reinforcement may alternatively consist of a substantially two-dimensional plastic injection molding, which is crowned in the shape of a cap, and the reinforcement may extend throughout the area of the cover—with the exception of the rated break lines—as far as to the region which is adjacent to the frame of the covering. As the reinforcing woven fabric has a relatively small stiffness, problems arise in the manufacture of the covering, because the reinforcing woven fabric must be placed into the injection mold and secured at a plurality of points by hand so that it will be exactly in a predetermined position in the covering. In spite of that fixation, the reinforcing woven fabric has often been separated from its anchoring by the plastic flowing into the injection mold and the reinforcing woven fabric has then floated up to the surface. The disadvantages of a reinforcement consisting of an injection molding of plastic are seen in that it has not been possible before to ensure the required elasticity and the peripheral stiffness which are required in view of the specific loads.

In order to eliminate these disadvantages, German Utility Model No. 87 13 154 discloses a covering in which the reinforcement of the cover sections is constituted by a metal plate, which emerges from the outer edge portion of each cover section and terminates in fixing lugs in the frame of the covering. Sheet metal edges of such a reinforcement may protrude from the plastic covering and may damage the gas bag as it is inflated. There is also a risk that a vigorous actuation of the button for actuating the horn may permanently deform the reinforcement and also the covering.

Published German Application No. 37 07 370 discloses a covering in which the cover sections are reinforced by a composite consisting of sheet metal and plastic. The frame of the covering consists of sheet metal and is joined to the carrier and sheet metal sections are provided on that edge of the sheet metal frame of the covering which is on the side facing the steering wheel. Said sheet metal sections extend into that edge portion of each cover section which is provided with a hinge. A reinforcement which consists of hard plastic is firmly joined to each sheet metal section and extends over the cover section. Where that covering is provided, the peripheral forces which are exerted as the gas bag is inflated are taken up by the sheet metal reinforcement and the accelerating forces exerted by the cover sections are taken up by the integrally injection molded plastic layer. The disadvantage of that composite consisting of sheet metal and plastic resides essentially in that said reinforcement must be embedded in the foamed covering in a special operation.

SUMMARY OF THE INVENTION

It is an object of the present invention to provide the gas bag apparatus for protection against an impact described first hereinbefore with a covering which does not require special reinforcing inserts.

This object is accomplished in that the covering consists of a one-piece injection molding which is made to thermoplastic elastomer and in which, in a special embodiment, the rated break lines have an initial rated break portion having a length of 5 to 30 mm and a wall thickness of 0.30 to 0.75 mm, and the wall thickness of the covering increases continuously along the rated break lines from the initial rated break portion to its termination disposed adjacent to the hingelike joint between the cover sections and the frame.

According to a further feature of the invention the wall thickness of the covering increases along the rated break lines from 0.90 to 1.20 mm adjacent to the free corners of the cover sections to 1.3 to 2.3 mm at its termination adjacent to the hingelike joint between the cover sections and the frame of the covering.

The cover sections of the covering have suitably a wall thickness of at least 2.5 to 6.0 mm.

In order to ensure an optimum function, the cover sections have a tear resistance of at least 4500 N adjacent to the hingelike joint connecting them to the frame.

The covering may preferably be made of a thermoplastic elastomer which has a hardness of 55 Shore A to 75 Shore D according to DIN 53505, an ultimate stress in excess of 5.5 MPa according to DIN 53504, an elongation at break in excess of 100% according to DIN 53504 and a thermal stability from −40° to +85° C.

To permit a firm connection between the thermoplastic covering and the carrier, a further feature of the invention resides in that injection-molded fixing lugs made of the same material as the covering are integrally joined to the bottom edge of the frame of the covering.

Alternatively, lug plates which are adapted to be joined to the carrier may be embedded in the injection molded frame of the covering.

The covering in accordance with the invention is shown by way of example in the drawing and will be explained more in detail hereinafter.

DETAILED DESCRIPTION OF THE INVENTION

Figure 1:
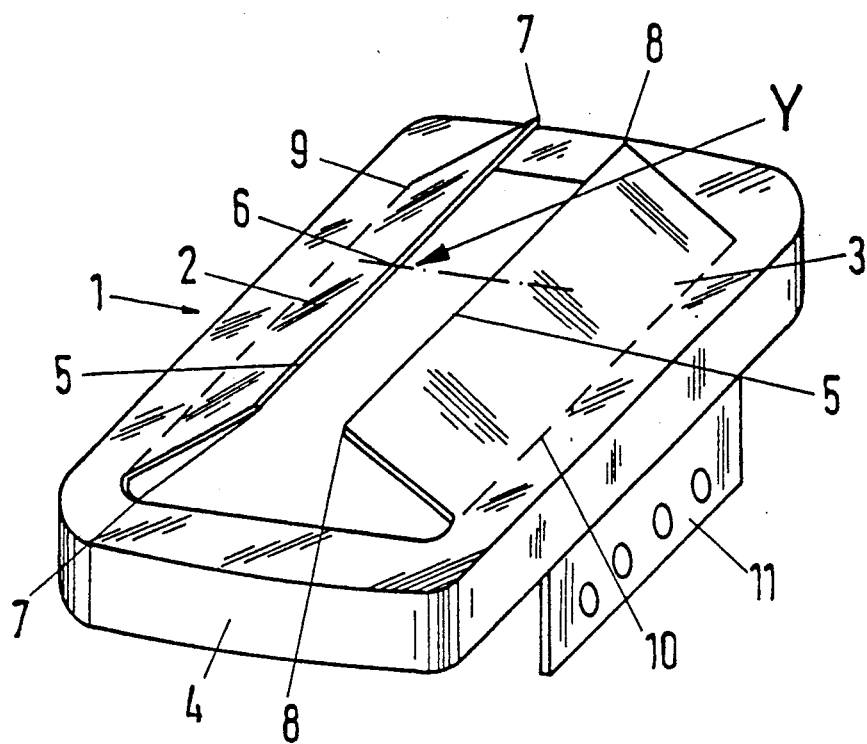
FIG. 1 is an isometric view of the apparatus according to the invention.
Figure 2:
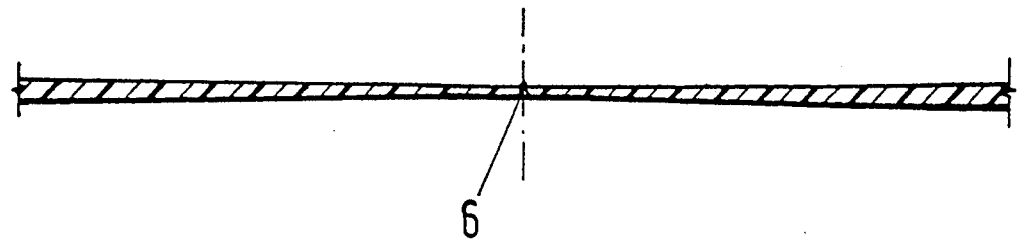
FIG. 2 is a sectional view of portion Y in FIG. 1.

FIG. 1 is an isometric view showing a covering 1, which consists of a one-piece injection molding made of thermoplastic elastomer. The covering 1 comprises two cover parts 2, 3, which are shown as they open, and have been torn open and deflected outwardly by the inflating gas bag, which is not shown. The cover parts 2, 3 are integrally connected to the frame 4 of the covering 1 by hingelike joints. The cover parts 2, 3 have been torn open along the rated break lines 5. FIG. 2 is an enlarged view showing the portion "Y" having the initial rated break portion 6 having a wall thickness of 0.5 mm and a length of 10 mm. From there, the wall thickness of the cover sections 2, 3 increases continuously to a wall thickness of 1 mm as far as to the free ends. Adjacent to the hinges 9, 10 between the cover parts 2, 3 and the frame the covering 1 has a wall thickness of 6 mm. Lugs 11 consisting of the same material as the frame 4 are integrally injection molded with the latter at that edge which faces the steering column and are used to secure the covering to the carrier.

The advantages afforded by the invention reside particularly in that the need for a reinforcement is eliminated owing to the selection of the material for the covering and because the loaded sections of the covering are designed in accordance with the invention. As a result, the weight is reduced and the manufacture of the covering is distinctly simplified.

What is claimed is:

1. A covering for a gas bag apparatus for protection aganist an impact which is adaptable to be integrated into a steering wheel or instrument board of a motor vehicle and has a carrier for accommodating a collapsed, inflatable gas bag and a solid-fuel-operated gas generator connected to the gas bag, wherein the covering comprises a one piece injection molding of thermoplastic elastomer including a peripheral annular frame securable to the carrier and configured to extend around a rim of the bag and a cover with defined rated break lines forming cover sections connected to the frame at hingelike joints and covering the bag, wherein the rated break lines have an initial rated break portion having a length of 5 to 30 mm and a wall thickness of 0.30 to 0.75 mm and wherein the covering has a wall thickness which increases continuously along the rated break lines from 0.90 to 1.20 mm at the initial rated break portion disposed adjacent to free corners of the cover sections to 1.3 to 2.3 mm at its termination disposed adjacent to the hingelike joints between the cover sections and the frame of the covering.

2. The covering according to claim 1, wherein the cover sections have a wall thickness of 2.5 to 6.0 mm.

3. The covering according to claim 1, wherein the cover sections have a tear resistance of at least 4500 N adjacent to the hingelike joints connecting them to the frame.

4. The covering according to claim 1, wherein the frame has a wall thickness of 3 to 6 mm and a tear resistance of at least 2500 N.

5. The covering according to claim 1, further comprising injection-molded fixing lugs made of the same material as the covering and integrally joined to a bottom edge of the frame of the covering.

6. The covering according to claim 1, further comprising fixing lug plates embedded in the injection-molded frame of the covering.

7. The covering according to claim 1, comprising thermoplastic elastomer having a hardness of 55 Shore A to 75 Shore D, an ultimate stress in excess of 5.5 MPa, an elongation at break in excess of 100% and a thermal stability from −40° to +85° C.

* * * * *